May 19, 1931.    R. H. SHAEN    1,806,422
SCALE READER FOR DRAFTSMEN
Filed Sept. 5, 1928
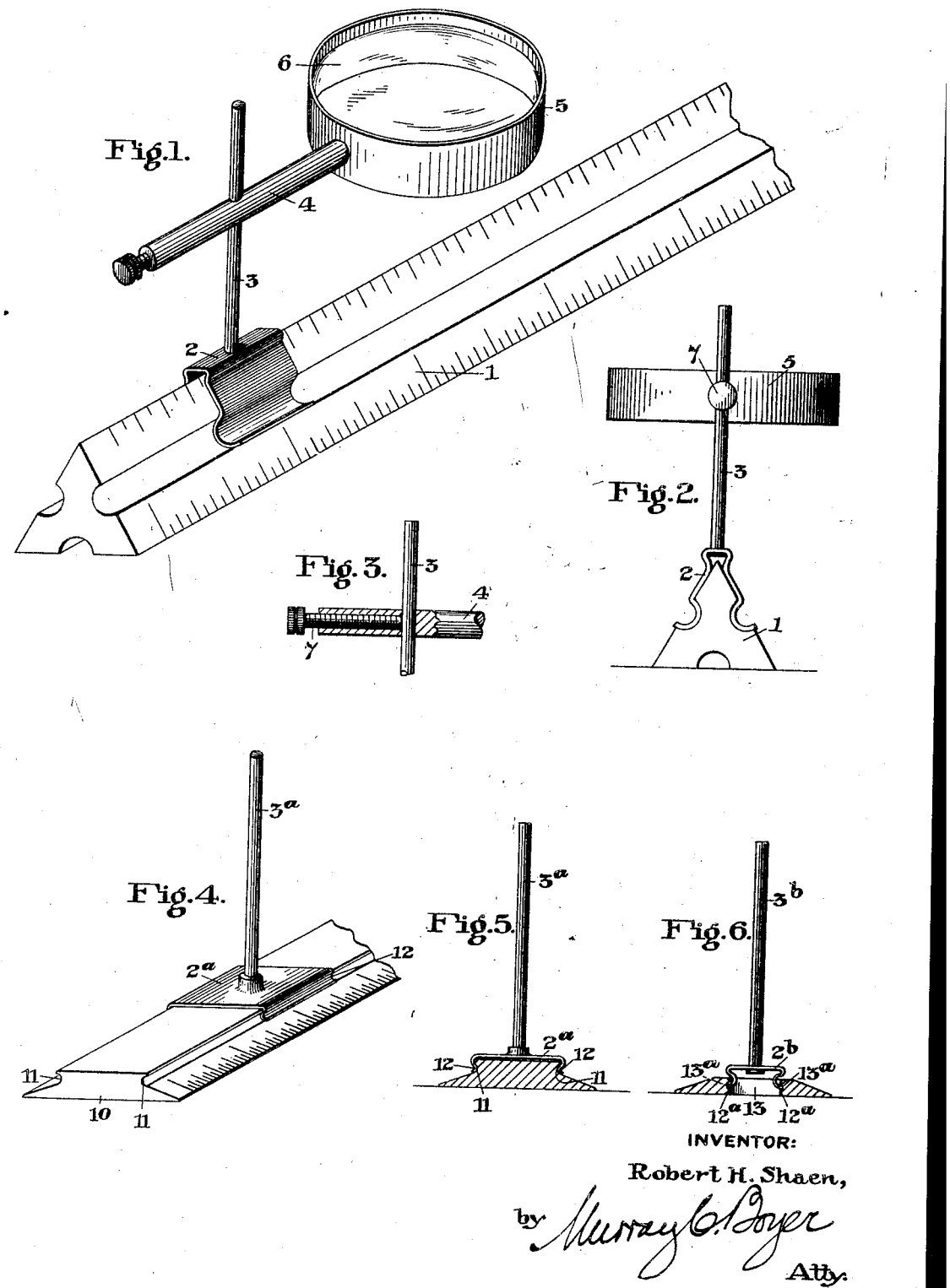
INVENTOR:
Robert H. Shaen,
by Murray C. Boyer
Atty.

Patented May 19, 1931

1,806,422

UNITED STATES PATENT OFFICE

ROBERT H. SHAEN, OF AMBLER, PENNSYLVANIA

SCALE READER FOR DRAFTSMEN

Application filed September 5, 1928. Serial No. 304,054.

My invention relates to magnifying devices and supporting and attaching means therefor, and the object of my invention is to provide a device that is readily applicable to and may be associated with the scales and/or rules employed by architectural and other draftsmen, whereby the graduation of such scales and rules which are usually so small and fine as to be difficult to read may be viewed through a magnifying lens, thereby facilitating the use of such scales and rules in the preparation of drawings, charts, maps and/or the like.

My invention comprises a structure which may be applied to or associated with the ordinary triangular scale and a structure applicable to flat scales; suitable modifications in the supporting and attaching means being illustrated in the drawings.

These and other features of my invention are more particularly described hereinafter; references being had to the accompanying drawings, in which:

Figure 1 is a perspective view illustrating a triangular scale and a magnifying glass associated therewith, embodying my invention.

Fig. 2 is an end elevation of one form of structure within the scope of my invention.

Fig. 3 is a sectional view illustrating a detail of my invention.

Fig. 4 is a perspective view illustrating a magnifying lens and supporting means applicable to a flat scale, and Figs. 5 and 6 are sectional views illustrating details of other supporting means within the scope of my invention.

In the drawings, 1 represents an ordinary triangular scale of the type commonly employed by architectural and other draftsmen in their usual work, and adapted to fit the body of the scale and be held in frictional contact therewith is a slidably mounted, one-piece clamping member 2. This clamping member carries a post 3, normally disposed in a vertical position, and upon this post I mount an arm 4, carrying a frame 5, within which is fitted a magnifying lens, 6. The arm 4 may be adjusted vertically with respect to the post 3, and may be extended from said post in any direction desired; the usual position of use being that indicated in the drawings. In order that the arm carrying the frame and magnifying lens may be held in the desired position, I provide a set-screw 7, shown in the present instance as having an elongated threaded stem which engages the post 3, as clearly indicated in Fig. 3.

As may be understood, the clamping member 2, which carries the post 3, may be positioned on the body of the triangular scale at any point and the magnifying lens may be on either side of the same to suit the convenience of the user. The contact of the clamping member 2, will be such that sufficient friction will be set up between the parts to insure maintenance of the support in the desired position although, if desired, a small set-screw may be employed to hold the clamp in fixed position relatively to the body of the triangular scale.

In addition to the use of my improved magnifying device with triangular scales, a simple modification renders my improved structure applicable to flat scales or rules, such as indicated in Figs. 4, 5 and 6. In Figs. 4 and 5 I have shown at 10, a flat scale having its central portion somewhat thicker than usual and provided with grooved edges 11, for engagement by the turned edges 12 of a clamping member 2ª, carrying a post 3ª, which is in all substantial respects like the post 3 of the structure illustrated in Figs. 1, 2 and 3.

In lieu of thickening the body of the scale to provide the grooved edges to be engaged by the clamping member, I may provide other forms of detachable supporting means for these flat scales, and in Fig. 6 I have shown a sectional view of a flat scale, provided with a central slot 13 having grooved walls 13ª for engagement by a clamping member 2ᵇ which bridges the slot having edges 12ª engaging the grooved walls 13ª; and from which a supporting post 3ᵇ projects.

It will be understood, of course, that the essential thing is to provide a simple and efficient mount which may be carried directly by the scale or rule and form with the latter a substantially new tool. It will be understood, therefore, that in such combination I do not wish to be limited to the precise character of supporting or clamping means for the arm of the frame carrying the magnifying lens.

I claim:

1. The combination of a scale or rule having grooved portions, a one-piece clamping member having surfaces adapted to engage said grooved portions, a post fixed to and projecting from said clamping member, and a magnifying lens adjustably mounted on said post.

2. The combination with a scale or rule having grooved portions, of a one-piece clamping member having surfaces adapted to engage said grooved portions, a post fixed to and projecting from said clamping member, an arm adjustably carried by said post, and a magnifying lens carried by said arm.

3. The combination with a magnifying glass and its supporting frame, of an arm carried by said supporting frame and lying in the plane of said magnifying glass; said arm being apertured, a post passing through said aperture, a set-screw fitting the end thereof and longitudinally movable with respect to said arm for engagement with said post whereby the arm may be disposed at different heights and in different positions relatively to said post, and a one-piece clamping member carried by said post for frictional engagement with a scale or rule.

In witness whereof I have signed this specification.

R. H. SHAEN.